(12) United States Patent
Carew

(10) Patent No.: US 7,674,377 B2
(45) Date of Patent: Mar. 9, 2010

(54) FILTER APPARATUS

(76) Inventor: E. Bayne Carew, 510 Grander View Dr., Milford, MI (US) 48381

( * ) Notice: Subject to any disclaimer, the term of this patent is extended or adjusted under 35 U.S.C. 154(b) by 0 days.

(21) Appl. No.: 12/186,421

(22) Filed: Aug. 5, 2008

(65) Prior Publication Data

US 2008/0290018 A1    Nov. 27, 2008

Related U.S. Application Data

(60) Continuation-in-part of application No. 11/942,525, filed on Nov. 19, 2007, now Pat. No. 7,513,372, which is a continuation-in-part of application No. 11/531,986, filed on Sep. 14, 2006, now abandoned, which is a division of application No. 10/863,798, filed on Jun. 8, 2004, now Pat. No. 7,122,123, which is a division of application No. 09/931,510, filed on Aug. 16, 2001, now Pat. No. 6,761,270.

(60) Provisional application No. 60/986,667, filed on Nov. 9, 2007, provisional application No. 60/225,895, filed on Aug. 17, 2000.

(51) Int. Cl.
*B01D 29/48* (2006.01)
*B01D 29/64* (2006.01)

(52) U.S. Cl. ............... 210/298; 210/304; 210/319; 210/351; 210/355; 210/413; 210/414; 210/415; 210/497.1; 210/512.3

(58) Field of Classification Search ........... 210/298, 210/304, 319, 321.63, 350, 351, 355, 413–415, 210/512.3, 497.1
See application file for complete search history.

(56) References Cited

U.S. PATENT DOCUMENTS

| | | | |
|---|---|---|---|
| 99,315 A | | 2/1870 | Heermance |
| 823,527 A | * | 6/1906 | Hardie .............. 210/415 |
| 1,414,132 A | | 4/1922 | Hurrell |
| 2,569,748 A | | 10/1951 | DeGrave |
| 3,542,197 A | | 11/1970 | Rosaen |
| 3,750,885 A | | 8/1973 | Fournier |
| 3,937,281 A | | 2/1976 | Harnsberger |
| 3,975,274 A | | 8/1976 | Nommensen |
| 4,113,000 A | | 9/1978 | Poisson |
| 4,199,454 A | | 4/1980 | Sartore |

(Continued)

FOREIGN PATENT DOCUMENTS

EP    0057670 A2    8/1982

(Continued)

OTHER PUBLICATIONS

English translation to Russian patent No. 2077925 C1.

(Continued)

*Primary Examiner*—Matthew O Savage
(74) *Attorney, Agent, or Firm*—Howard & Howard Attorneys PLLC

(57) ABSTRACT

A filter apparatus, including a dual-chambered, centrifugal and compressive filtration apparatus having a central annular filter element, rotating external radial fins extending from adjacent the filter element to adjacent an outer cannister wall and internal fins within the annular filter element. The disclosed filter element is a continuous resilient, cylindrical, helical filter coil including a regular sinusoidal shape defining loop-shaped filter pores between adjacent coils.

16 Claims, 7 Drawing Sheets

U.S. PATENT DOCUMENTS

| | | |
|---|---|---|
| 4,227,576 A | 10/1980 | Calderon |
| 4,277,261 A | 7/1981 | Miko et al. |
| 4,292,178 A | 9/1981 | Mori et al. |
| 4,430,232 A | 2/1984 | Doucet |
| 4,690,761 A | 9/1987 | Orlans |
| 4,742,872 A | 5/1988 | Geske |
| 4,804,481 A | 2/1989 | Lennartz |
| 4,901,987 A | 2/1990 | Greenhill et al. |
| 4,938,869 A | 7/1990 | Bayerlein et al. |
| 5,152,892 A | 10/1992 | Chambers |
| 5,207,930 A | 5/1993 | Kannan |
| 5,240,605 A | 8/1993 | Winzeler |
| 5,824,232 A | 10/1998 | Asher et al. |

FOREIGN PATENT DOCUMENTS

| | | |
|---|---|---|
| EP | 0159961 A1 | 10/1985 |
| EP | 0995475 A1 | 4/2000 |
| GB | 0527259 | 10/1940 |
| RU | 2077925 C1 | 4/1997 |
| WO | 9102578 A1 | 3/1991 |
| WO | 9307944 A2 | 4/1993 |

OTHER PUBLICATIONS

PCT International Search Report, International Application No. PCT/US01/25731; International Filing Date Aug. 16, 2001.

* cited by examiner

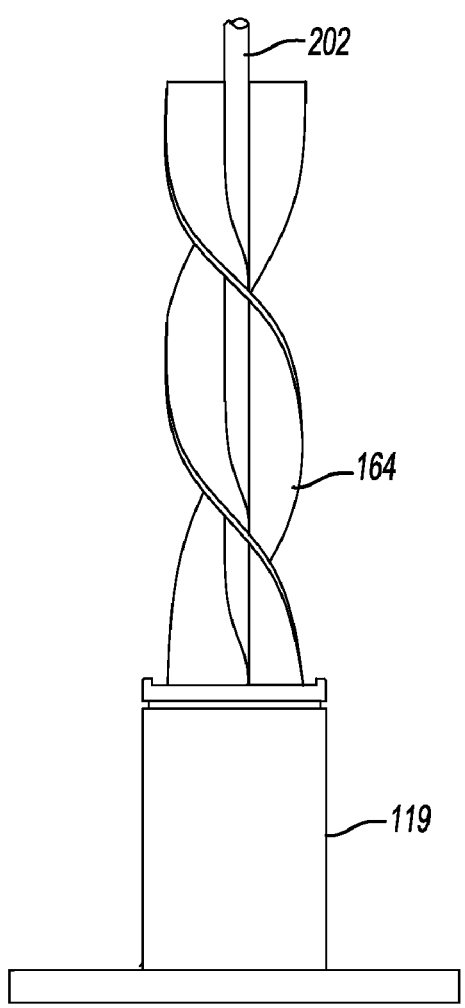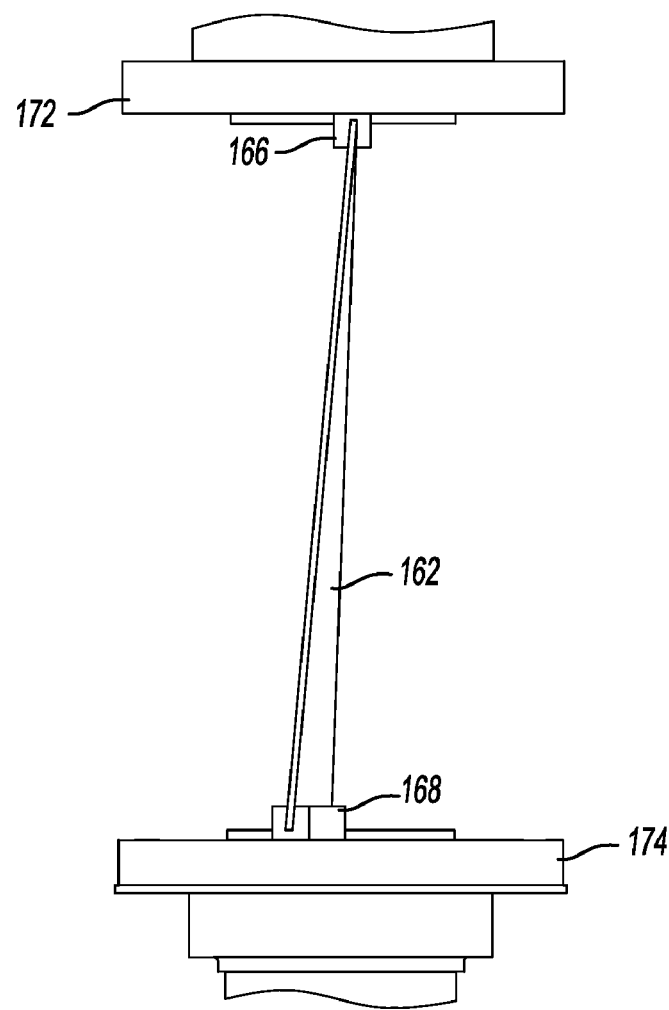
Fig-11
Fig-12 ions titled National Pollution Discharge Elimination System and Effluent Limitations Guidelines and Standards for Concentrated Animal Feeding Operations (CAFO's) managed by government entities. Many such wastes are not allowed within a landfill, and land application is increasingly restricted for reasons of health and environmental safety.

FILTER APPARATUS

RELATED APPLICATIONS

This Application claims priority to U.S. Provisional Application Ser. No. 60/986,667, filed Nov. 9, 2007 and is a continuation in part application of U.S. Ser. No. 11/942,525, filed Nov. 19, 2007, now U.S. Pat. No. 7,513,372, which application was a continuation in part application of U.S. Ser. No. 11/531,986, filed Sep. 14, 2006, now abandoned, which application was a divisional application of U.S. Ser. No. 10/863,798, filed Jun. 8, 2004 now U.S. Pat. No. 7,122,123 issued Oct. 17, 2006, which application was a divisional application of U.S. Ser. No. 09/931,510, filed Aug. 16, 2001, now U.S. Pat. No. 6,761,270 issued Jul. 13, 2004 which application claims priority to U.S. Provisional Patent Application No. 60/225,895, filed Aug. 17, 2000.

FIELD OF THE INVENTION

This invention relates to a filter apparatus, particularly including a dual-chambered, centrifugal and compressive filtration apparatus for separating waste solids and fluids. The filter apparatus of this invention may be used to separate any suspended solids in fluids, including air or liquids, such as water and oil and phases, including water, oil, and solids, and may be used to separate solids of two microns or less.

BACKGROUND OF THE INVENTION

Residential, industrial and agricultural wastes and sludges are potentially a rich source of carbon based energy for electric power if dried sufficiently for use as a solid fuel source. These wastes often include increasingly scarce fresh water, which needs to be recovered in a potable condition. The solids in the past have been buried in a landfill or land applied, but are now regulated under discharge limits found in the United States Federal Industrial Pre-treatment Program or under new regulations titled National Pollution Discharge Elimination System and Effluent Limitations Guidelines and Standards for Concentrated Animal Feeding Operations (CAFO's) managed by government entities. Many such wastes are not allowed within a landfill, and land application is increasingly restricted for reasons of health and environmental safety.

Municipal and industrial waste treatment systems typically employ some combination of chemical additives for coagulation with screw or belt presses, vibratory devices, hydro cyclones, centrifuges and (or) settling tanks and ponds to separate solids from water. Treatment at concentrated animal feed lots uses little technology other than dredging solids from open pond storage and land application. These management means occupy large footprints, are expensive to maintain and increasingly acknowledged to put workers and residents at health risk. By contrast, the double chambered high speed centrifugal filtration of my invention described herein may continuous and enclosed fluids purification, heat and vacuum solids drying and sterilization. This equipment may be modular with high throughput, relatively small and mobile.

Related devices employ cyclonic action dependent on fluid rotation at relatively low revolutions per minute as a result of being introduced off-center and under line pressure. The filter apparatus of my invention may perform a series of solids and liquid processing functions without the characteristic application of expensive and time consuming chemistries. This combination generates compressed and dry solids from suspended and soluble slurries for use as fuels and/or fertilizer.

Fresh water is an increasingly scarce resource. The appearance of antibiotics and antibiotic resistant bacteria in run offs from all sources are subject to new regulation. Waste carbon solids, from a potential energy perspective, are known to convert at the rate of 3 lbs. dry waste (6,000 Btu per pound) to 1 kW electrical power. If recovered dry waste solids could be fed to an electric power plant, and would contribute substantially to our national energy budget. Global warming and population growth continue to limit the supply of fresh water, which argues for greater efforts to recycle both waste solids and water. The modular core devices noted here address this issue.

The filtration apparatus of this invention also addresses the need to separate waste water from emulsified oil. The flat wire aperture of this multi chambered centrifugal device successfully breaks the emulsion. The continuous discharge centrifugal filter subsequently achieves a three phase separation of waste solids, water and oil without chemicals. Both oil and water are thus recyclable. The present invention conserves clean water, usable fuels, lubricants and other industrially useful products.

SUMMARY OF THE INVENTION

This invention relates to a filter apparatus for filtering fluids, including residential, industrial, and agricultural waste and sludges to recover potable water, oils, hydrocarbons, alcohols, cleaning fluids, waste gases, etc. and the filter assembly of this invention may be used to separate solids to microns or less.

In one disclosed embodiment, the filter apparatus of this invention comprises a continuous resilient generally cylindrical helical coil including a plurality of inter-connected generally circular coils, wherein each coil has a substantially regular sinusoidal shape in the direction of the helix, including opposed top and bottom surfaces of adjacent coils in contact at circumferentially spaced locations forming loop-shaped filter pores between adjacent coils. In the disclosed embodiment, the continuous flexible resilient generally cylindrical helical coil is formed from flat wire stock, such that the top and bottom surfaces of the inter-connected generally circular coils have opposed flat top and bottom surfaces with the flat top and bottom surfaces of adjacent coils in contact forming the loop-shaped filter pores. In the disclosed embodiment, the filter assembly includes a filter drive engaging the helical coil to increase or decrease the volume of the filter pores to filter materials of a selected size. In one disclosed embodiment of the filter apparatus of this invention, the filter apparatus includes a first filter drive engaging the helical coil compressing or releasing compression of the helical coil to increase or decrease a volume of the loop-shaped filter pores. Further, in one disclosed embodiment of the filter apparatus of this invention, the apparatus includes a second filter drive engaging the helical coil and rotating at least one of the generally circular helical coils relative to a remainder of the circular coils into an out of registry, thereby modifying and accurately controlling a volume of the loop-shaped filter pores. The first filter drive, for example, may include a piston driven against the helical coil by pneumatic or hydraulic pressure for controlling the volume of the filter pores and for quick release and expansion during purging. In the disclosed embodiment, the second filter drive may be a stepper motor for example connected to one of the helical coils and accurately rotating and controlling rotation of one of the generally circular helical coils relative to a remainder of the coils rotating the helical coils into and out of registry and very accurately controlling the volume of the filter pores from substantially zero to a predetermined volume. The flat top and bottom surfaces may also include radial grooves providing flow of fluids through the helical coil and filtering fluids into the submicron pore size. For example, the grooves may have a depth of between 0.1 mm and 10 microns, or less. The diameter of the generally cylindrical coil will also depend upon the application.

In the disclosed embodiments of the centrifugal filter apparatus of this invention, the apparatus includes a cannister housing having a generally cylindrical internal surface, an inlet and at least one outlet. The filter apparatus includes a central generally cylindrical annular filter element having a plurality of circumferentially spaced filter pores which may be the disclosed resilient generally cylindrical helical coil described above and disclosed in this application or an alternative conventional generally cylindrical annular filter. In the disclosed embodiment, the filter apparatus further includes rotating external centrifugal radial fins extending generally radial from adjacent an external surface of the annular filter element to adjacent the generally cylindrical internal surface of the cannister housing and a drive mechanism rotating the external centrifugal radial fins which drive solids in the filter cannister radially outwardly against the generally cylindrical internal surface of the cannister which may be removed through a solids outlet adjacent the outer wall. In the disclosed embodiment, the centrifugal filter apparatus of this invention further includes internal centrifugal radial fins rotatably supported within the annular filter element and the drive mechanism rotates both the external and internal centrifugal radial fins. In the disclosed embodiment, the internal centrifugal radial fans are canted, driving liquid supernatant downwardly through a generally axial liquid outlet. Further, the external centrifugal radial fins may also be canted and the radial fins may be rotatably driven by the drive mechanism in the same direction during filtering and the internal centrifugal radial fins may be rotated in the opposite direction during purging. As will be understood by those skilled in this art, the fins may be canted for example by angling the fins relative to the rotational axis or the fins may be helical, such that the fins drive the filtrate upwardly or downwardly depending upon the direction of rotation of the radial fins.

It is thus an object of this invention to provide a filtration apparatus for separating and extracting suspended and dissolved solids from waste fluids, reducing the isolated solids to a state of substantial dryness for conversion to fuels and stable fertilizers. The filtrate fluids, either gas oil, water, or both water and oil, may be purified for recycling. The disclosed embodiment of the centrifugal filter apparatus of this invention may include one or more centrifugal functions separated by a self-cleaning sinusoidal coil whose apertures may be regulated in size and shape. The centrifugal functions may be both internal and external to the sinusoidal filter coil which, in combination, may be utilized to generate substantially dry, sterile solids and potable water.

As will be understood by those skilled in this art, various modification may be made to the filter apparatus of this invention within the purview of the appended claims. The following description of the preferred embodiments and the embodiments of the filter apparatus disclosed in the appended drawings are for illustrative purposes only and do not limit the scope of this invention except as set forth in the appended claims. Further advantages and meritorious features of the filter apparatus of this invention will be more fully understood from the following description of the preferred drawings and the appended claims, a brief description of which follows.

BRIEF DESCRIPTION OF THE DRAWINGS

FIG. 11 is a partial side view of the internal radial centrifugal fins; and

FIG. 12 is a partial side view of FIG. 9 in the direction of view arrows 12-12.

DESCRIPTION OF THE PREFERRED EMBODIMENTS

As set forth above, the embodiments of the filter assembly of this invention disclosed in the following description of the preferred embodiments are for illustrative purposes only and various modifications may be made to such embodiments within the purview of the appended claims. Referring to the figures, wherein like numerals indicate like or corresponding parts throughout the several views, a filter assembly for filtering a fluid is generally disclosed at 10. It is understood that the filter apparatus 10 and method of this invention is capable of filtering both liquids and gases as the fluid. However, the filter apparatus 10 of the subject invention is more preferably used to filter fluids having solid particles including, without limitation, slurries of biological or organic waste, including oils. As such, the filter apparatus 10 may be used in combination with other devices, including ion exchange or chelation affinity apparatus or a filter press as discussed further below.

Figure 1:
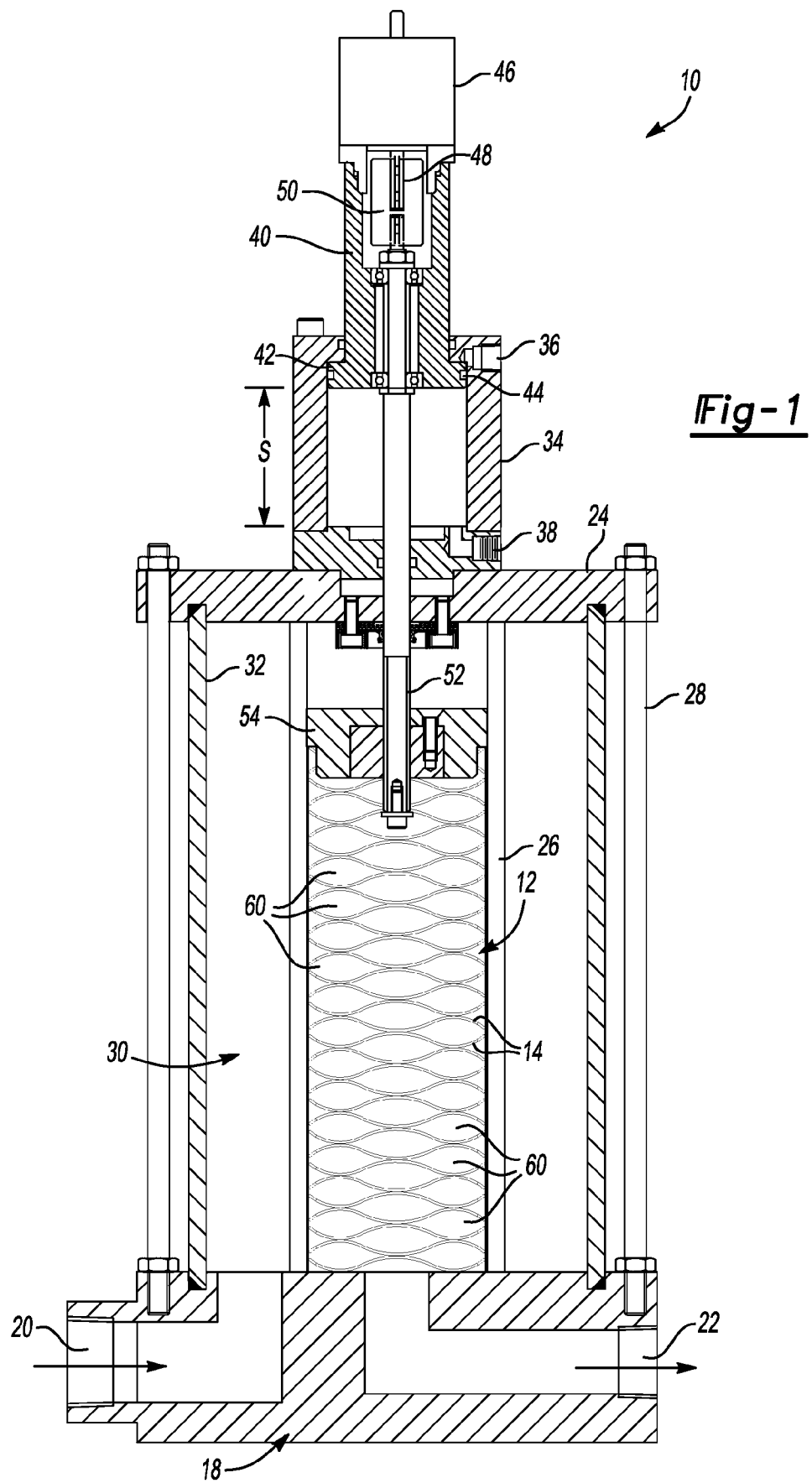
FIG. 1 is a partially cross-sectioned side view of one embodiment of a filter assembly of this invention with the filter element fully expanded.
Figure 2:
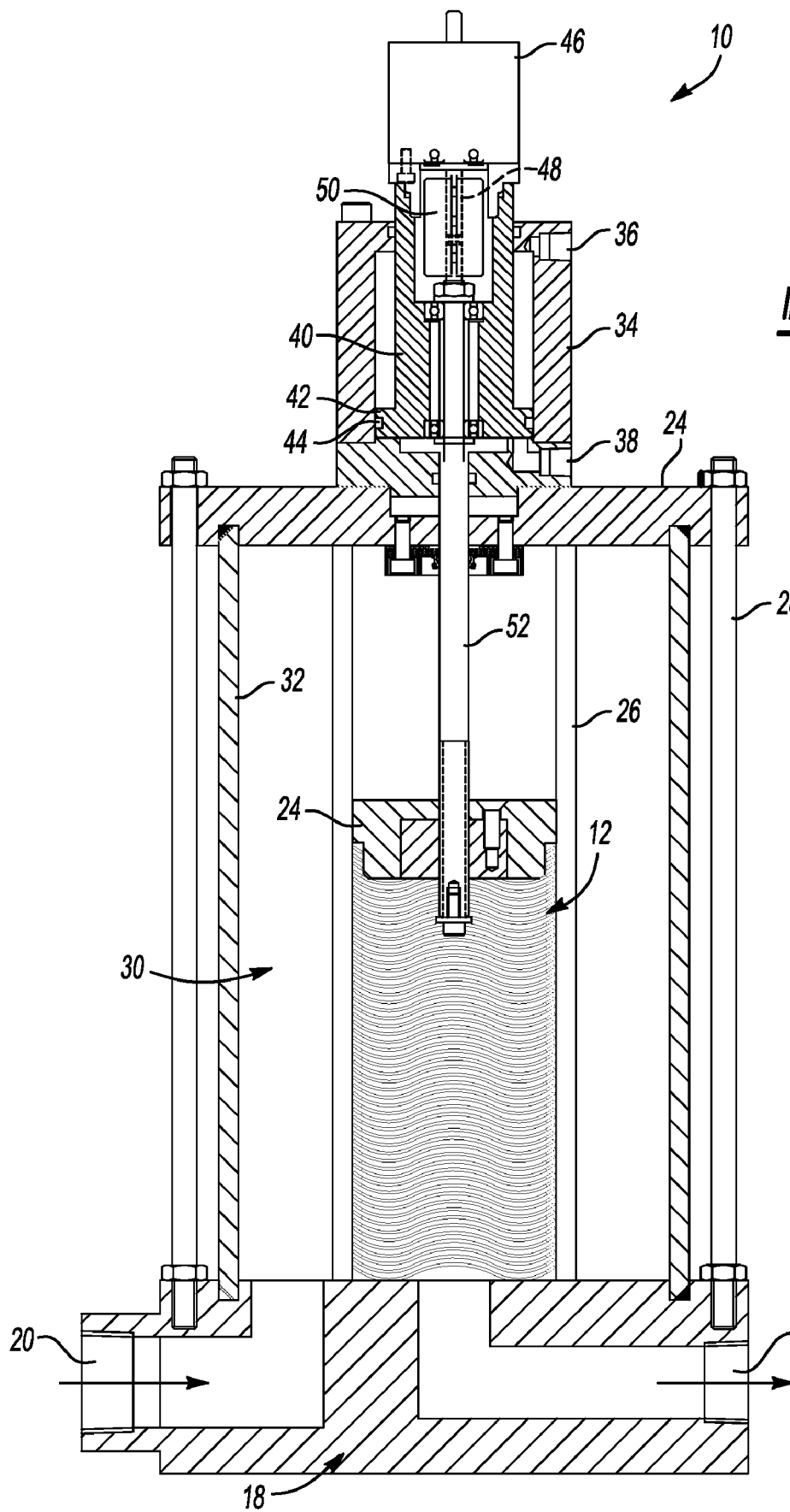
FIG. 2 is a partially cross-sectioned side view of the filter assembly shown in FIG. 1 with the coils of the filter in registry and substantially compressed.
Figure 3:
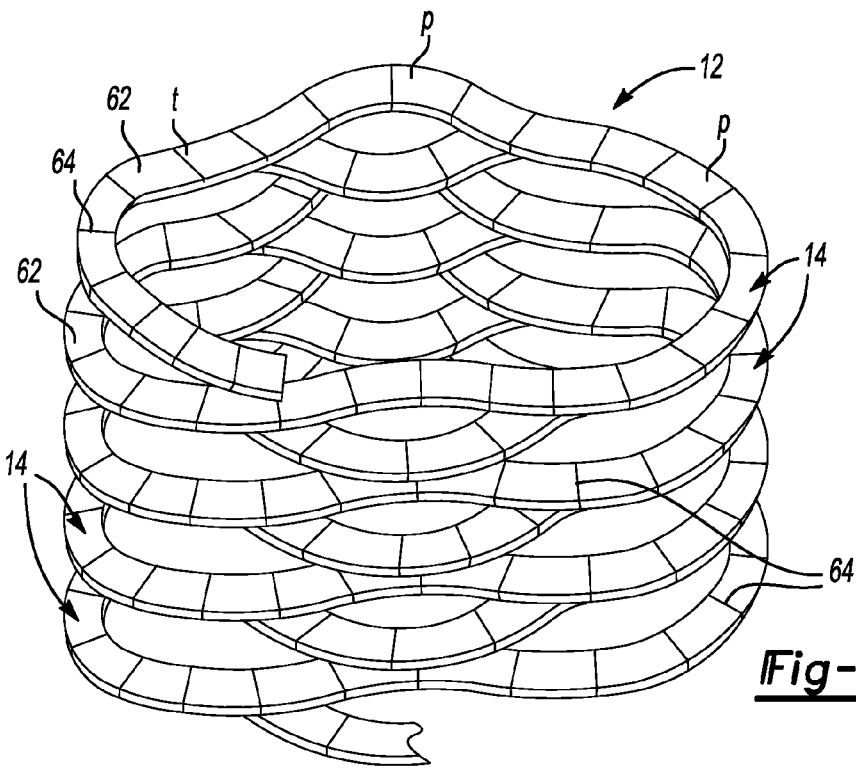
FIG. 3 is a partial top perspective view of the filter element shown in FIG. 1.
Figure 4:
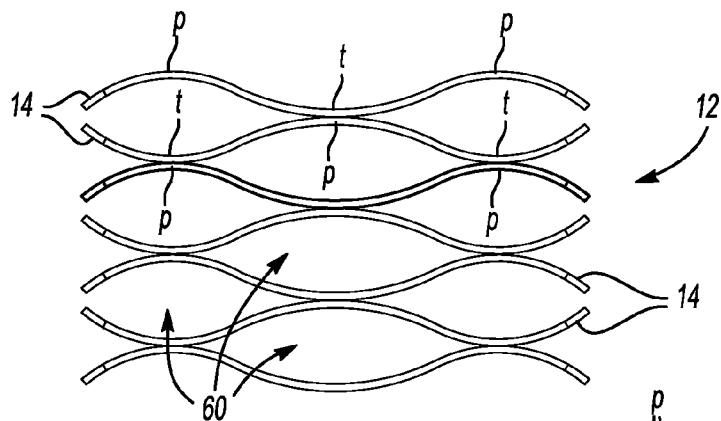
FIG. 4 is a partial side view of the expanded filter element shown in FIG. 1.

FIGS. 1 to 6 illustrate one embodiment of the filter assembly 10 of this invention which may be utilized to perform the methods of filtration described herein. The filter assembly 10 shown in FIGS. 1 and 2 includes a filter element 12 includes a continuous generally cylindrical helical coil having a plurality of circular interconnected helical coils 14 as best shown in FIG. 3, wherein each circular helical coil has a plurality of regular sinusoidal wave forms or shapes including circumferentially spaced peaks and troughs as shown in FIG. 3. The peaks "p" and troughs "t" of adjacent coils 4 are in contact to provide enlarged "loop-shaped" or eyelet-shaped filter pores between adjacent coils as shown in FIG. 4, or the peaks "p" and troughs "t" of adjacent coils 14 may be aligned as shown for example in FIG. 6 as described below.

The filter assembly 10 shown in FIGS. 1 and 2 includes a lower housing 18 having an inlet 20 and an outlet 22 for receiving a fluid stream to be filtered, such as a waste gas or liquid stream as described above. The filter assembly 10 further includes a cover 24 which is supported on the lower housing member 18 by circumferentially spaced inner and outer retention posts 26 and 28, respectively. A filtration chamber 30 is defined between the lower housing member 18 and the cover 24 by a cylindrical housing wall 32. Thus a fluid stream received through inlet 20 is received under pressure in the filtration chamber 30 for filtration by the filter element 12. The fluid stream including contaminants is then received through the filter pores or the radial grooves as described below through the filter element 12 into the axial center of the filter element 12 and the filtrated fluid is then discharged through the outlet 22. As described above, the particles, molecules or material removed by the filter element are removed by backwashing as further described below.

This embodiment of the filter assembly 10 shown in FIGS. 1 and 2 further includes a pneumatic cylinder 34 attached to and supported on the cover 24 of the housing having an air inlet 36 and an air outlet 38. A piston assembly 40 is reciprocally supported in the pneumatic cylinder or chamber 34 including a piston head 42 having an O-ring 44, such that the piston assembly 40 is sealingly supported within the pneumatic cylinder 34. The piston assembly 40 has a stroke "S" as shown in FIG. 1. Pneumatic pressure supplied through air inlet 36 of the pneumatic cylinder 34 will thus drive the piston assembly 40 downwardly from the position shown in FIG. 1 to the position shown in FIG. 2 as described in more detail hereinbelow.

In the disclosed embodiment, the filter assembly 10 further includes a drive assembly engaging the helical coil filter element 12 moving adjacent coils 14, thereby modifying and controlling a volume of the loop-shaped filter pores between adjacent coils as now described. In the disclosed embodiment, the filter assembly 10 includes a stepper motor 46 attached to and supported by the upper end of the piston assembly 40 as shown in FIGS. 1 and 2. As will be understood by those skilled in this art, a stepper motor is a brushless, synchronous electric motor that can divide a full rotation into a large number of steps. When commutated electronically, the motor's position can be controlled precisely, without any feedback mechanism. Although a stepper motor has several advantages for this application, any other type of rotary drive may also be utilized. The driveshaft 48 of the stepper motor 46 is connected in the disclosed embodiment to an upper end of the cylindrical helical filter element 12 to relatively rotate the filter coils to accurately control the volume of the loop-shaped filter pores 60 as described below. The driveshaft 48 of the stepper motor 46 in the disclosed embodiment is connected to a coupling 50 as shown in FIGS. 1 and 2. A shaft 52 connected to the coupling 50 is connected to a clamp assembly connected to the upper end of the filter element 12. The lower end of the filter element 12 is rigidly connected to the lower housing member 18 such that, upon rotation of the clamp assembly 54 by the stepper motor 46, the coils 14 of the filter element 12 are rotated relative to each other as described below.

In the disclosed embodiment, the circular interconnected coils 14 of the filter element 12 are initially aligned crest or peak "p" to trough "t" as shown in FIG. 4 with the filter pores or openings 60 enlarged to their maximum. Alternatively, it would also be possible to initially align the coils peak to peak and trough to trough. It is important to understand, however, that the width or amplitude of the sinusoidal wave or curve has been greatly exaggerated in FIGS. 1, 3 and 4 for a better understanding of the filter assembly of this invention and the method of filtration. As set forth above, the volume of the openings or loop-shaped filter pores 60 of the filter element 12 in the filter apparatus of this invention may be accurately controlled to filter different fluids. First, the piston assembly 40 may simply be extended to compress the filter element, thereby reducing the size or volume of the filter pores 60 by supplying air under pressure through the inlet 36 of the pneumatic cylinder 34. However, in one preferred embodiment, the drive 46 rotates at least one of the coils 14 relative to the remainder of the coils, thereby relatively sliding the opposed flat top and bottom surfaces of adjacent coils relative to each other into and out of registry, thereby accurately controlling the volume of the loop-shaped pores 60. Further, because the filter element 12 is formed of a stiff resilient metal, such as stainless steel, the loop-shaped filter pores 60 are all modified simultaneously, such that all filter pores have essentially the same volume, which is important for accurate control.

Figure 5:
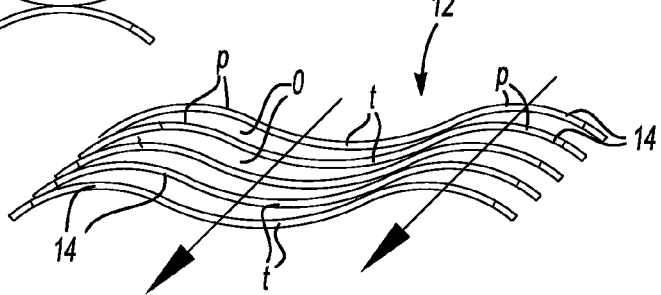
FIG. 5 is a partial side view of the filter element shown in FIG. 4 with the filter coils partially in registry, reducing the size of the filter pores.
Figure 6:
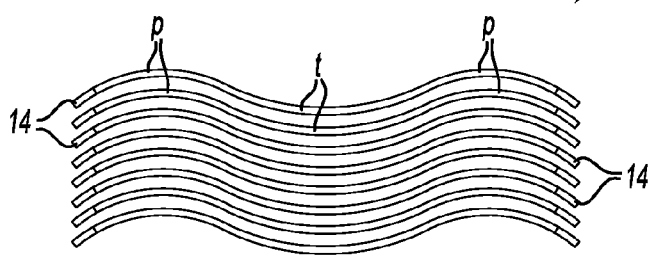
FIG. 6 is a partial side view of the filter elements shown in FIGS. 4 and 5 with the filter coils in full registry as shown in FIG. 2.

As best shown in FIG. 5, rotation of the upper coil of the continuous cylindrical helical coil filter element 12, by rotation of the driveshaft 48 of the stepper motor 46 causes the peaks "p" of adjacent coils to rotatably slide on the flat upper and lower surfaces 62 relative to the remaining coils, reducing or expanding the apertures or filter pores 60. Finally, as shown in FIG. 6, the sinusoidal-shaped coils may be moved or rotated into full registry, such that the peaks "p" and troughs "t" are fully aligned. Again, however, the spacing between adjacent coils 14 has been exaggerated in FIG. 6 for clarity. In fact, the adjacent coils may be in full contact, such that the filter pores 60 between adjacent filter coils is reduced to essentially zero. However, in the disclosed embodiment, at least one of the opposed flat surfaces 62 of the filter coils 14 includes circumferentially spaced radial grooves 64 permitting the flow of fluids through the filter element when the filter pores 60 between adjacent coils are reduced to substantially zero. Thus the radial grooves 64 significantly increase the applications for the filter assembly 10 of this invention.

Having described the embodiment of the filter assembly 10 of this invention as shown in FIGS. 1 to 6, the operation of the filter assembly may now be described. In one embodiment of the filter apparatus 10 of this invention, the filter element 12 is a continuous substantially cylindrical resilient helical coil having a regular sinusoidal shape including regular peaks "p" and troughs "t" as described above. The filter element may be formed of stainless steel, such as 316 stainless steel, which is stiff and resilient. However, the helical coil filter element may also be formed of a Hastaloy or other steel or even plastic. Another advantage of stainless steel is corrosion resistance. The coil preferably has flat top and bottom surfaces 62, such that the flat surfaces of adjacent coils will slide against each other during rotation as best shown in FIGS. 4 to 6. A suitable thickness between the flat top and bottom surfaces 62 is 0.4 to 2 mm having a width of between 3 and 6 mm. The preferred number of sinusoidal waves of each coil will depend upon the application. However, it has been found that between 3 and 10 sinusoidal curves or waves for each coil 14 will be very suitable for most applications. Further, the "width" of the loop-shaped openings or filter pores will also depend upon the application, but it has been found that filter pores having a maximum width of about 0.5 mm is suitable for most applications. Finally, the depth of the radial grooves 64, which may be formed by laser etching, is preferably between about 0.1 to 10 microns.

The filter assembly 10 is thus operated by adjusting the apertures or loop-shaped filter pores 60 to the desired volume for filtration depending upon the fluid to be filtered by either extending the shaft 52 using pneumatic pressure through inlet port 36, driving the piston assembly 40 downwardly in FIG. 1 to compress the coils against each other, thereby reducing the volume of the filter pores 60 or by retracting the shaft 52 using pneumatic port 38 to increase the volume of the filter pores. However, in one preferred embodiment, the stepper motor 46 may be simultaneously rotated to bring the peaks "p" and troughs "t" into and out of registry as shown, for example, in FIG. 5. As described above, rotation of the upper coil will simultaneously rotate all coils relative to the bottom coil because the filter element is formed of a stiff resilient material, such as 316 stainless steel. The coils may be rotated into full registry, as shown in FIG. 6, wherein the filter pores are reduced to substantially zero and wherein the fluid flow is only through the radial grooves 64. The fluid to be filtered is then received through the housing inlet 20 into the filter chamber 30 and flows through the filter element 12 as shown in FIG. 2. As will be understood, the filter apparatus may be used to filter almost any fluid depending upon the filter pore size including, for example, residential, industrial and agricultural waste and sludges to produce, for example, potable water from waste and may be used for the clarification and refinement of waste oil from waste water-oil mixtures, etc. Upon completion of the filtering process or when the filter element 12 becomes clogged with the particles or media suspended in the fluid, the filter element 12 may be easily flushed by opening the filter pores 60 as shown in FIG. 1 and flushing solution is then received through the outlet 22 and flushed through the filter element 12. In the disclosed embodiment, backwashing may be facilitated by rotating the stepper motor in the opposite direction from the direction used to compress the coils 14 of the filter coil while maintaining the clamp assembly 54 in the extended position as shown in FIG. 2. Then, upon completion of the filtering process, the filter element is "opened" by simply retracting the clamp 54 to the open position shown in FIG. 1 which can be accomplished in a second or two.

The filter apparatus 110 illustrated in FIGS. 7 to 12 may be characterized as a centrifugal filter apparatus or more specifically a dual-chambered centrifugal and compressive filtration apparatus for separating waste solids or fluids including, for example, waste solids in oils, water and gas. The elements of the centrifugal filter apparatus 110 are numbered where appropriate in the same sequence as the filter apparatus 10 described above, but in the 100 series to reduce the requirement for a detailed description of like components. The disclosed embodiment of the filter apparatus 110 includes a central annular filter element 112 which, in the disclosed embodiment, is a continuous flexible resilient generally cylindrical helical coil including a plurality of interconnected generally circular helical coils 114 as described above with reference to the filler element 12. However, the centrifugal filter apparatus of this invention may alternatively include any conventional annular generally cylindrical filter element although the helical filter element 112 is preferred in many applications.

The filter apparatus 110 includes a lower housing member 118 and a base member 119, an inlet 120, a supernatant outlet 121 and a solids outlet 122 through base member 119. The disclosed embodiment of the filter apparatus 110 further includes upper housing members 123, 124 and 125, which are retained to the lower housing member 118 by circumferentially spaced retention posts. The disclosed embodiment includes a first annular filtration chamber 130 surrounding the annular filter element 112 and a second filtration chamber 131 within the annular filter element 112 as further described below. The first filtration chamber 130 is defined by the cylindrical housing wall 132 defining a cylindrical inner surface 133. In the centrifugal filter apparatus 110 of this invention, the internal wall 133 of the cannister housing is preferably cylindrical to accommodate the centrifugal fins described below.

The disclosed embodiment of the filter apparatus 110 includes a first pneumatic port 136 adapted to compress the helical filter element 112 and a second pneumatic port 138 adapted to expand the helical filter element as described below. The apparatus further includes a pneumatic cylinder 134 receiving a piston 140 actuated by pneumatic pressure through the pneumatic ports 136 and 138 as described below. The disclosed embodiment of the filter apparatus 110 further includes a motor 142, such as a stepper motor described above, for rotating one or more of the helical coils 114 relative to a remainder of the helical coils into and out of registry to finely adjust the eyelet-shaped filter pores 160 between adjacent helical coils 114 as also described above. In this embodiment, the motor 142 includes a drive shaft assembly 144 connected to a drive gear 146. The drive gear 146 rotatably engages a driven gear 148 which is connected to a tubular driven shaft 150 connected to the upper helical coil 114 as described above with regard to the filter apparatus 10.

In one preferred embodiment, the helical filter element 112 includes both a first filter drive compressing or expanding the helical filter element and a second drive rotating one or more of the helical coils 114 into and out of registry for very accurately controlling the volume of the filter pores 116 between adjacent helical coils 114. In the disclosed embodiment, the first drive is a pneumatic drive, wherein pneumatic pressure received through inlet pneumatic port 136 drives the piston 140 downwardly in FIG. 7 to compress the helical filter element 112. Alternatively, the first drive may be hydraulic. An advantage of a pneumatic filter drive is that the compression on the helical filter element 112 may be released quickly during purging. Detailed or accurate control of the volume of the filter pores 116 in this embodiment is controlled by the second drive which, in the disclosed embodiment, is a stepper motor 142. The stepper motor 142 rotates the drive shaft 144, which rotates the drive gear 146. The drive gear 146 rotates the driven gear 148 and the tubular drive shaft 150 connected to the upper end of the helical filter element 112 to rotate at least one of the helical coils 114 relative to a remainder of the helical coils, thereby rotating the helical coils into and out of registry as described above. FIG. 8 illustrates the filter apparatus 110 after closing the filter pores 160 using the pneumatic adjustment mechanism and rotating the helical filter coils 114 into registry as described above with reference to FIG. 2.

Figure 7:
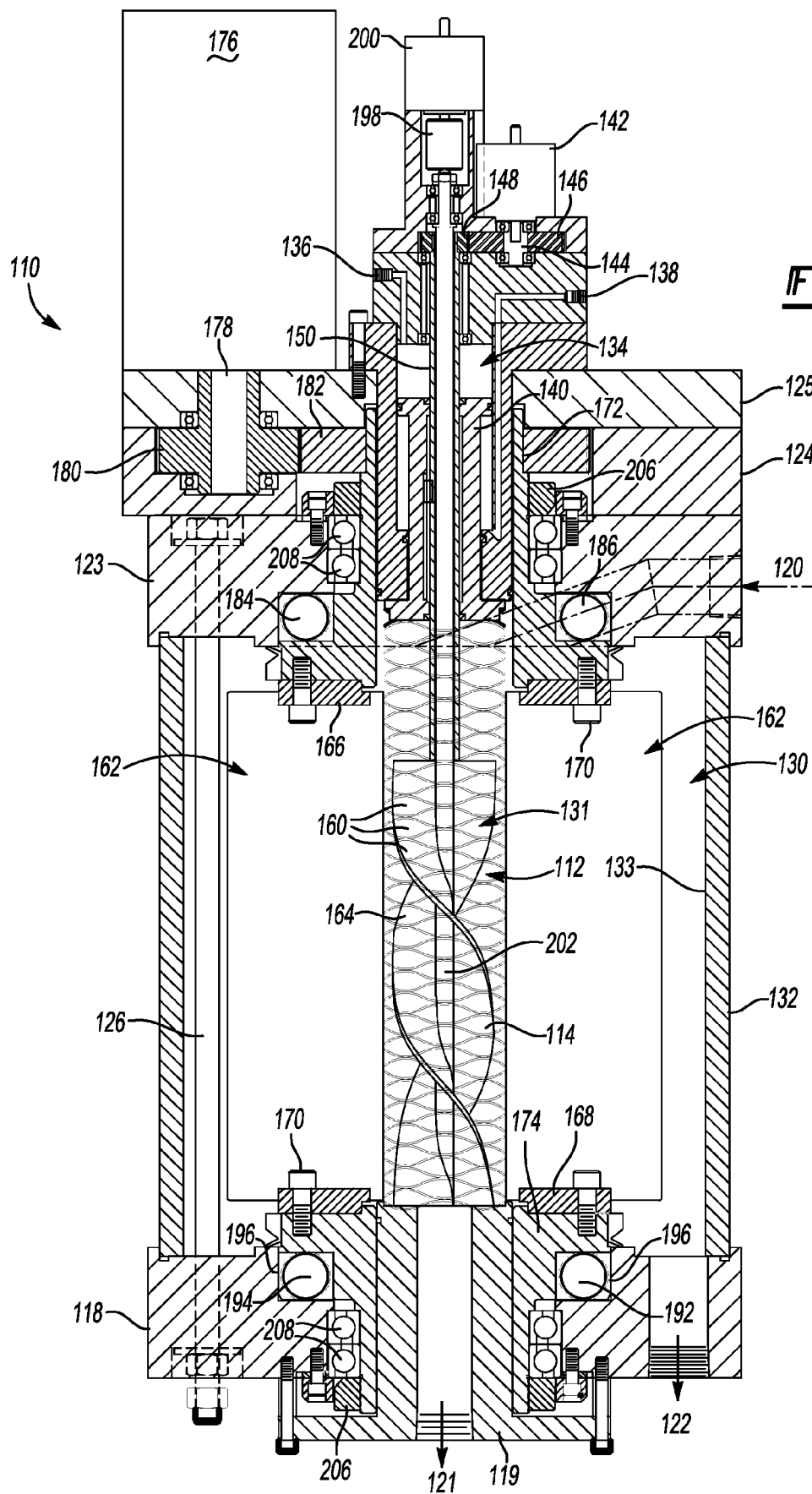
FIG. 7 is a partial side cross-sectional view of a centrifugal filter apparatus of this invention with the helical filter element fully expanded.
Figure 8:
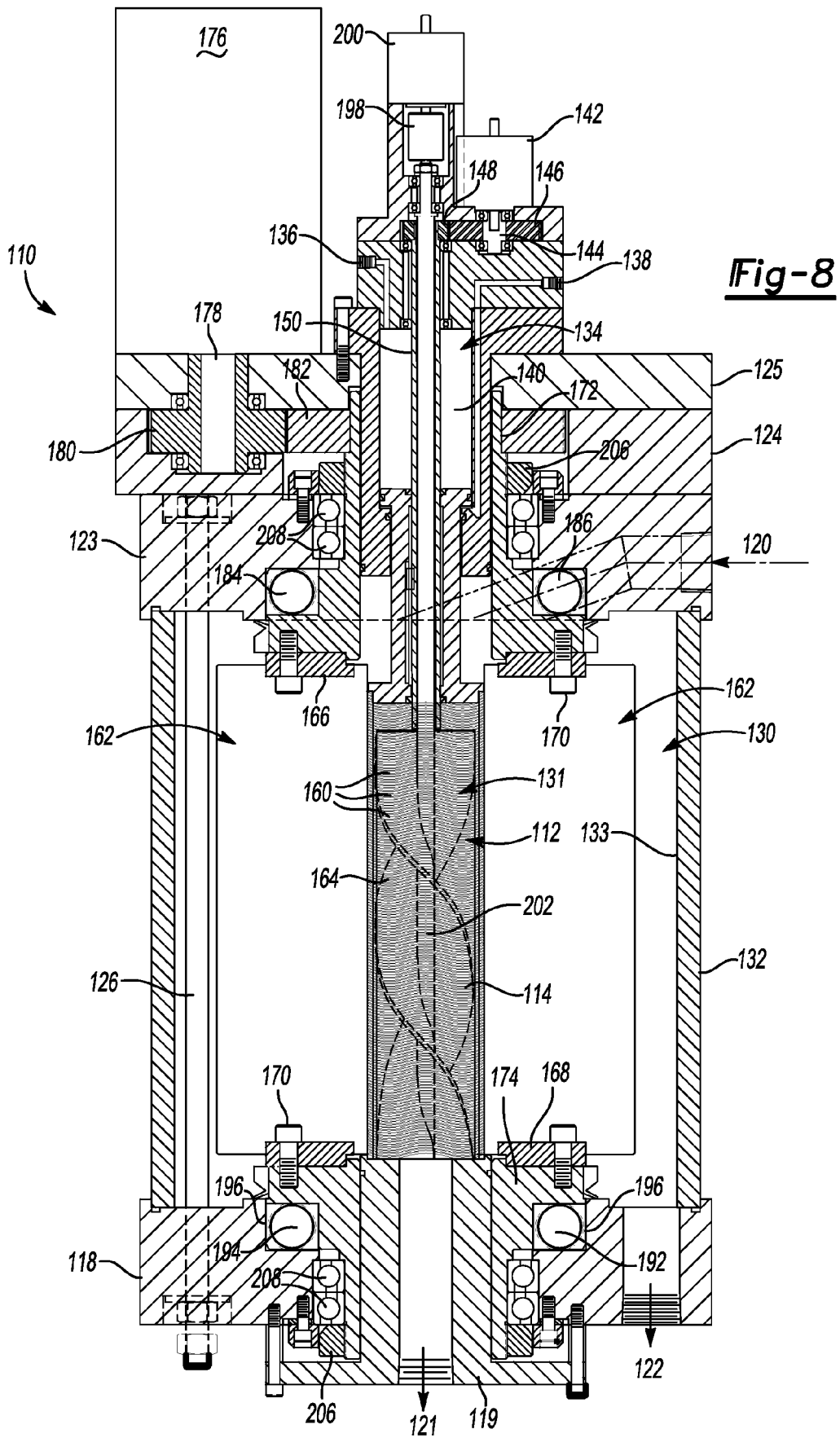
FIG. 8 is a side partially cross-sectioned view of the centrifugal filter apparatus shown in FIG. 7 with the helical filter element fully compressed.
Figure 9:
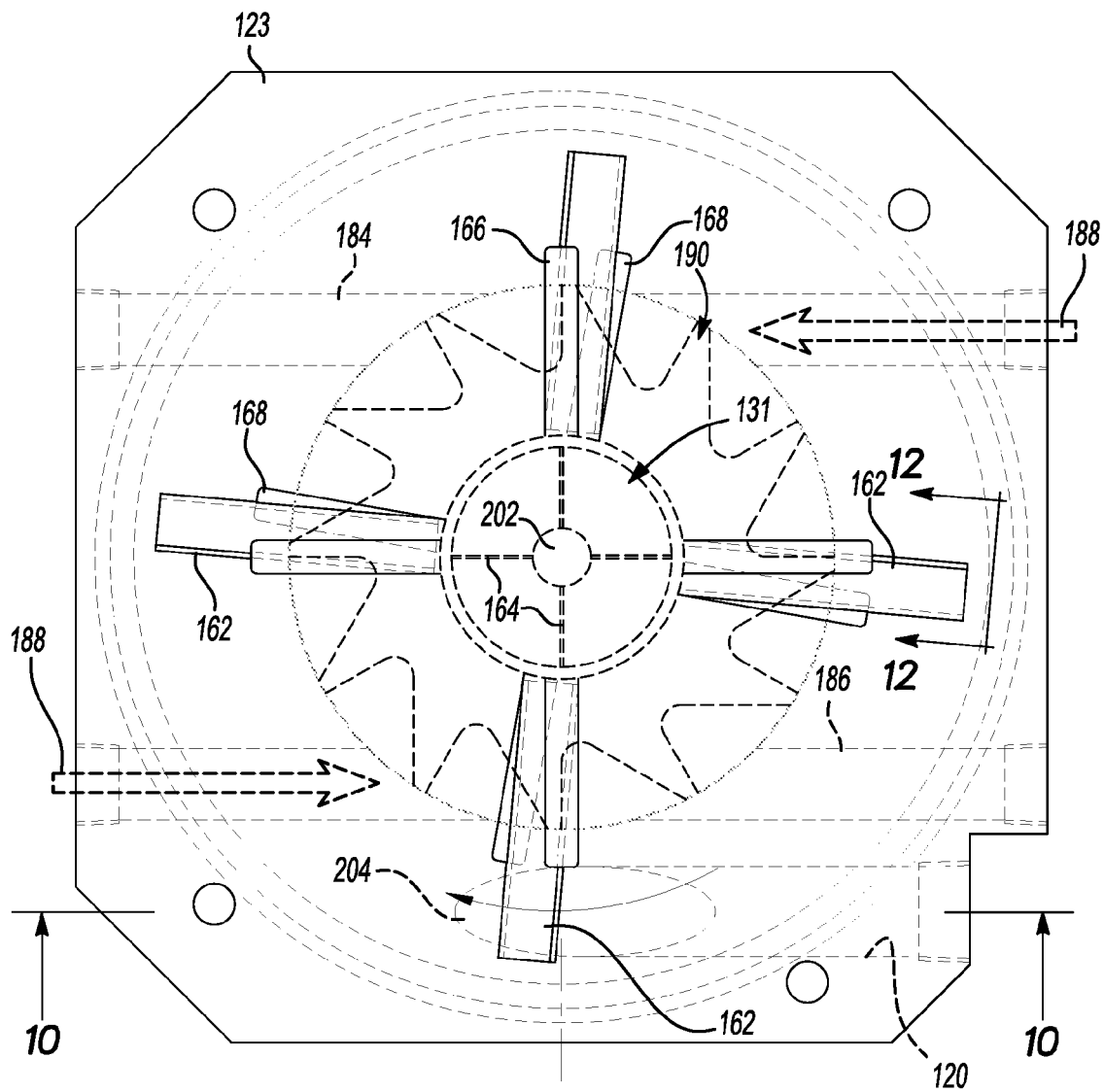
FIG. 9 is a top plan view of the filter assembly shown in FIGS. 7 and 8 with the motors removed.

In the disclosed embodiment of the centrifugal filter apparatus 110 of this invention, the apparatus includes external rotating centrifugal radial fins 162 shown in FIGS. 7 and 8 and internal rotating centrifugal radial fins 164 shown in FIGS. 9 and 11. As described below, the external and internal centrifugal radial fins 162 and 164, respectively, cooperate during filtration and purging of the helical filter element 112 to significantly improve filtering by the filtering apparatus of this invention. In the disclosed embodiment of the centrifugal filter apparatus 110, the external centrifugal radial fins 162 are rigidly supported by upper bracket members 166 and lower bracket members 168 by bolts 170 as shown in FIGS. 7 and 8. The upper bracket member 166 is also rigidly connected by bolts 170 to the upper spindle 172 and the lower bracket members are rigidly connected to the lower spindle member 174 by bolts 170. The upper spindle 172 is rotatably driven by electric motor 176. The drive shaft 178 of the electric motor is fixed to an external drive gear 180, which drives a driven gear 182 fixed to the upper spindle 172. Thus, the electric motor 176 rotatably drives the upper spindle 172 which rotates the external centrifugal radial fins 162 within the outer or first filtration chamber 130.

In the disclosed embodiment of the centrifugal filter apparatus 110, the external centrifugal radial fins 162 are also driven by pneumatic pressure as also shown in FIG. 9. As shown in FIG. 9, the upper housing member 123, which serves as a cover for the filter cannister, includes two pneumatic channels 184 and 186, which have a circular cross-section as shown in FIGS. 7 and 8. Air under pressure is injected into the pneumatic channels 184 and 186 in opposite directions as shown by the arrows 188 to turn the turbine blade 190 at the outer surface of the spindle 172 as shown at 190 in FIG. 7. Thus, pneumatic pressure injected through pneumatic ports 184 and 186 rotate the external centrifugal radial fins 162. In the disclosed embodiment, the lower spindle 174 is also pneumatically driven. The lower spindle includes pneumatic channels 192, 194 which drive a turbine 196 as described above with regard to the pneumatic channels 184, 186 and turbine 190.

As will be understood from the above description of the drives for the external centrifugal radial fins 162, the fins may be rotatably driven by the motor 176 or pneumatic pressure injected through pneumatic ports 136 and 138 in the upper spindle 172 and through ports 192 and 194 through the lower spindle 174. As will be understood by those skilled in this art, the motor drive and the pneumatic drives may be used in combination depending upon the type of motor 176 or independently depending upon the conditions. For example, where the waste being filtered by the centrifugal filter apparatus 110 must be continuous, the pneumatic drive may be used as a back-up in the event of an electrical power failure.

In the disclosed embodiment of the centrifugal filter apparatus 110 of this invention, the internal centrifugal radial fins 164 as shown in FIGS. 9 and 11, are rotatably driven by electric motor 198 shown in FIGS. 7 and 8. The motor 198 is supported in a housing 200. The drive shaft of the motor 198 rotatably drives rod 202 and the internal centrifugal radial fins 164 are mounted on the rod 202 as shown in FIG. 9. Thus, the motor 198 rotates the internal centrifugal radial fins 164 independently of the external centrifugal radial fins 162.

Figure 10:
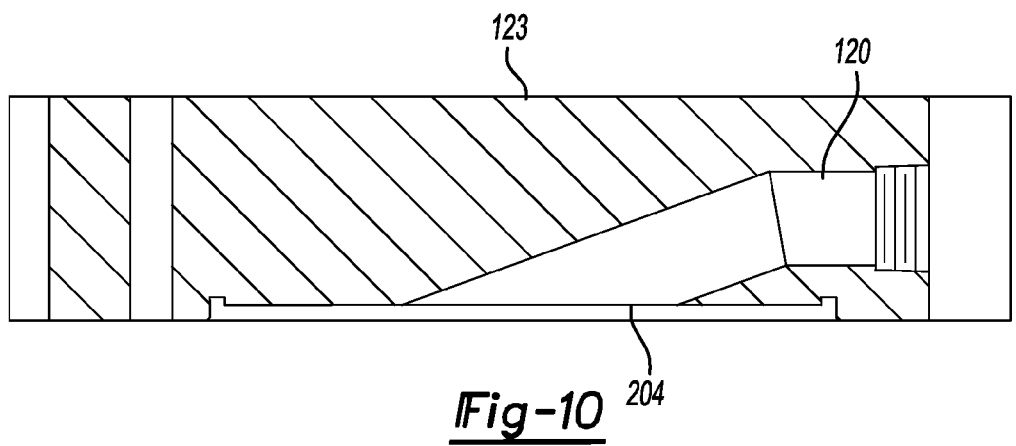
FIG. 10 is a cross-sectional view of FIG. 9 in the direction of view arrows 10-10.

In the disclosed embodiment of the centrifugal filter apparatus 110, both the external and internal centrifugal radial fins 162 and 164, respectively, are canted relative to the axis of rotation of the fins to drive liquid in a predetermined direction. In the disclosed embodiment, the external centrifugal radial fins 162 are pitched or tilted relative to the axis of rotation as best shown in FIG. 12. As will be understood by those skilled in this art, the external centrifugal radial fins 162 may be formed in a spiral or pitch prior to assembly in the filter apparatus 110 or the fins may be planar and pitched during assembly by securing the ends into the upper and lower bracket members 166 and 168 as shown in FIG. 12. The internal centrifugal radial fins 162 in the disclosed embodiment are spiral and secured by welding, brazing, or other methods of attachment to the 202 in a spiral around the rod as shown in FIG. 11. As used herein, the term "canted" includes any tilt or angle, including spiral, generating a radial or axial force on the liquid in a desired direction to improve filtering. To further increase the rotational force on the liquid, the liquid waste is directed through the inlet 120 tangentially into the first annular filtration chamber 130 as also shown in FIGS. 9 and 10. The liquid waste is injected under pressure tangentially through the inlet port 120 into a spiral passage and exits through outlet 204 into the annual first filtration chamber 130 generating an additional centrifugal force.

Having described the basic components of the centrifugal filter apparatus 110, the method of filtration by the filter apparatus will now be understood by those skilled in this art. The liquid to be filtered is injected under pressure into the inlet 120 and the liquid is then directed through the passage in the upper housing member 123 into the annular first filtration chamber 130, tangentially in the disclosed embodiment. The liquid to be filtered is very rapidly rotated in the annular first filtration chamber 130 by rotation of the external centrifugal radial fins 162, driving heavier or denser material in the filtrate radially outwardly under centrifugal force against the cylindrical inner surface 133 of the housing wall 132. The solids are also driven downwardly against the cylindrical inner surface 133 to the solids outlet 122 adjacent the cylindrical inner wall 133. During filtration, the internal centrifugal radial fins 164 are rotated to drive supernatant liquid downwardly toward the outlet 121, drawing liquid through the helical filter element 112 into the second filtration chamber 131, providing a final filter for the liquid waste. As will be understood from the above description of the filtration apparatus 10 in FIGS. 1 to 6, the filter pores 60 between adjacent coils may be adjusted to filter solids of any dimension or size. Further, in this embodiment of the centrifugal filter apparatus 110, much of the filtration is accomplished by the external centrifugal radial fins 162 which drive solids radially outwardly to the solids outlet 122. The helical filter element 112 of the centrifugal filter apparatus 110 of this invention may be easily backwashed quickly by injecting air through pneumatic port 138, raising the piston 140, opening the filter pores and driving backwash liquid through the supernatant outlet 121. This reversal in the direction of rotation of the internal centrifugal radial fins 164, driving backwash liquid through the helical filter element and the external radial fins 162 then drives the liquid radially outwardly through the solids outlet 122.

The dual chambered centrifugal and compressive filtration apparatus 110 will separate fluids and suspended solids into components based upon their respective densities by an integrated combination of centrifugal and filtration mechanisms. Incoming fluids containing solids are rotated at selected velocities, for example, 10,000 revolutions per minute, to achieve waste solids liquids separation in the millisecond to second range. This generates G-forces in the 13,000 range in a cannister whose radius is 15 cm. Solids separate from suspended fluid in this gravitational field at clearing times proportional to their densities and masses. The suspension introduced at the inlet 120 deposits on the cannister inner cylindrical surface 133. Upon clarification, liquid media is forced through the helical filter element 112. Heavy particles will clear quickly into the space between the external centrifugal radial fins 162 and the filter cannister's wall 133. It will be noted that the direction of rotation of the external fins 162 corresponds to the direction of flow of the incoming solids and fluid suspension through inlet 120. This parallel flow, where the suspended solids are introduced adjacent the outer surface subjects the dense and more massive particles to maximum G-forces, at the point of greatest radial distance from the center of rotation. The solids dewater and collect at the inner surface 133 of the cannister housing, thereafter continuing to rotate downward toward the solids output or exit 122. The aspect ratio cross-section to cannister height may vary from 4:20 to 4:1 depending on volume throughput and time sedimentation time requirements. The solids clearing (sedimentation) time (T) is proportional to radial distance from the center of rotation (r), velocity ($v_f$) and density (dm)

of fluid medium, particle density ($d_p$), diameter ($D^2$) and a rotational velocity ($RPM^2$). From calculations using $T=r/v_{f\,xD}^{2}(d_m-d_p)_{xRPM\,2}$, where r and D are in cms., the clearing times for waste particles are calculated to be in the millisecond to second ranges at $10^4$ RPMs, well within the dwell times within this centrifugal filtration device, if the volume is 20 gallons and the flow rate were to be 60 gallons per minute.

As set forth above, the external and internal centrifugal radial fins 162 and 164, respectively, may be canted with pitch values to reduce materials drag at high G-forces and to facilitate uniform radial transport in that field with maximum sheer and solid particulates. As used herein, "canted" includes angle or pitch as shown, for example, by the angled external centrifugal radial fins 162 in FIG. 12 or the fins may be spiral as the internal centrifugal radial fins 164 spirally surround the central drive rod 202. The pitch values may also vary from top to bottom of the cannister in a spiral manner, for example, to further reduce shear of incoming solids. The solids introduced at 120 are subjected to centrifugal forces acting on the solids; the suspending fluids, however, are driven by both centripetal (central orienting pressures) forces and negative (pull) pressures exerted by the internal centrifugal radial fins 164. The suspended fluids are thus clarified. The combination rapidly and completely separates solids and liquids, without the use of thickening or flocking chemistries. It is apparent that the internal and external centrifugal radial fins 162 and 164, respectively, along with line pressure force clarified fluids and solids to exit that their respective outlets 121 and 122, respectively. The centrifugal fins simulate a conventional centrifuge head, except that the cannister (head equivalent) is stationary and the fluids or solids are in motion. The non-sedimentation solids rotate in a neutral zone surrounding the helical filter 112 to be removed and combined with the solid fraction upon periodic backwash. These sedimented solids exit the cannister or housing adjacent the cylindrical inner surface 133 of the cannister housing 132 through solids outlet 122.

As will be understood, the centrifugal filter apparatus 110 of this invention may be used to remove microscopic and submicroscopic particles from industrial stack, combination engine exhaust, syngasses generated by gasifiers and valuable machine oils. To extend the range of the filtration to submicroscopic levels, the helical coils 114 may include radial grooves as shown at 64 in FIG. 3 for filtration of submicroscopic particles when the helical filter element 112 is substantially fully closed as shown in FIG. 8. The backwash will take no longer than three seconds and may only infrequently be required due to the continuous removal of essentially all of the suspended solids by the centrifugal action of the external centrifugal radial fins 162. The backwash cycle is either called through computer-activated relays in response to an in-line pressure transducer at the inputs or is routinely set to occur at some time interval. Backwash cycles in a dual chambered centrifugal of this invention is capable of flow reversal of clean filtrate back thought its core, through its filter, and out through the solids outlet carrying retentate with it, may be initiated in any sequence, either though individual units or in pairs or simultaneously through all units in parallel. If the central flow reversing internal radial fins 164 are not included in the filter unit, backwash may still be accommodated, whereby diverting a portion of the clean fluid of one filter of a pair to its parallel sister though split stream valves momentarily flushes the second unit. Repeat of the shared cleansing cycle completes the paired backwash. In the disclosed embodiment of the centrifugal filter apparatus 110, filtration and driver shaft units are pressure sealed internally with seals 206 as shown in FIGS. 7 and 8. Further, because the external centrifugal radial fins 162 are rotated at very substantial velocities, the spindles bearings 208, such as fully caged brass or ceramic bearings.

The centrifugal filter apparatus 110 may be used for clarifying used machine or vehicle oils, which are known to contain a wide distribution of metallic, silicone and plastic solids contaminants from millimeter to micron size. Rancid oils also contain colonial bacterial forms with cross-sections exceeding ten microns. Clarification improves the ability of reprocessing plants to recycle such waste products for reuse as machine or engine lubricants or as fuel blends for power plants. Most oils contain polar emulsifying agents to assist in the suspension of solid particulates, water and chlorinated paraffins. These emulsifying water-oil-particulate fractions, referred to as micelles are found to form size-specific cross-sections in the range of 250 microns and 50 microns. The flat wire helical filter element of this invention is found to break up these micelles as a consequence of frictional forces, assisted by heating. The flat wire helical coil filter element 112 breaks the emulsions in three phases, which the centrifugal filter will separate. After a micelle break-up with heat and passage through the helical filter element 112, the micelle cracks, releasing contained water, polar emulsifying agents, particulates, chlorinated paraffin, which all separate from useful oil in the centrifugal filter apparatus of this invention by a three-phase split.

The centrifugal filter apparatus 110 of this invention may also be combined with ancillary equipment for further clarification of the liquid and drying of the solids. For example, the liquid or supernatant outlet 121 of the filter cannister may be directed to a chelating or ion exchange adsorbent column to remove soluble (waste) chemicals. The liquid supernatant may be passed through a resin column, further purifying the liquid. To achieve further drying and sterilization of the solids exiting the filtration apparatus through solids outlet 122, the partially dry solids may be directed into a filter press consisting of a compressive element as shown at 54 having a piston compression, for example, wherein the partially dried solids are heated and compressed depending upon the application. This compression element is not, in this instance, used to adjust the filter's pores or apertures but to apply pressure to the solids fed to the filter's core though 22. This modification uses the filter's pores to retain the solids while expressing the liquid phase through 20. The base plate 18 may include a sliding valve which is triggered to open when the piston element driven by the shaft 52, below 54, has reached maximum extension as measured by the driver motor 46.

As set forth above, various modifications may be made to the filter apparatus of this invention within the purview of the appended claims. For example, various drives may be used to rotate the external and internal centrifugal radial fins 162 and 164, including various types of motors and drive chains or belts. Although the disclosed embodiment of the centrifugal filter apparatus includes a helical filter element 112, in certain applications other more conventional annular filters may be used. The shape of the filter cannister may be modified, but in a preferred embodiment, the internal surface 133 is cylindrical. Further, although the filter drive preferably includes both a pneumatic piston drive and a rotational drive to open and close the filter pores, the filter drive may only include one of the described filter drives. Further, although the external and internal centrifugal radial fins are preferably canted as described, the fins may also be planar and perpendicular to the axis of rotation.

Having described preferred embodiments of the filter apparatus of this invention, the invention is now claimed as follows.

The invention claimed is:

1. A centrifugal filter apparatus, comprising:
   a canister housing having an enclosed internal filter chamber, an inlet and an outlet;
   a central annular filter element having a plurality of circumferentially spaced filter pores located within said filter chamber;
   external centrifugal radial fins surrounding said annular filter element rotating around said filter element and canted relative to an axis of said filter element driving fluid relative filter element;
   internal centrifugal radial fins rotatably supported within said annular filter element and canted relative to an axis of the filter element; and
   a drive mechanism rotating said external and internal centrifugal radial fins.

2. The centrifugal filter apparatus as defined in claim 1, wherein said internal centrifugal radial fins are canted downwardly relative to an axis of rotation of said internal centrifugal radial fins, driving liquid supernatant downwardly through a generally axial liquid outlet.

3. The centrifugal filter apparatus as defined in claim 1, wherein said annular filter element is a continuous flexible resilient helical coil having a regular sinusoidal shape in the direction of the helix defining circumferentially spaced loop-shaped filter pores between adjacent helical coils, and including a filter drive engaging said helical coil to adjust a volume of said loop-shaped filter pores.

4. The centrifugal filter apparatus as defined in claim 3, wherein said helical coil is formed from flat wire stock forming flat engaging upper and lower surfaces on adjacent helical coils, and said filter drive including a motor engaging one of said filter coils rotating said one of said helical coils relative to an adjacent helical coil into and out of registry, thereby adjusting a volume of said filter pores.

5. The centrifugal filter apparatus as defined in claim 3, wherein said filter drive includes a piston driven against said helical coil by pneumatic or hydraulic pressure for increasing or decreasing a volume of said filter pores and permitting quick release during purging.

6. The centrifugal filter apparatus as defined in claim 1, wherein said internal centrifugal radial fins are spiral shaped.

7. A centrifugal filter apparatus, comprising:
   a canister housing having a generally cylindrical internal surface, an inlet and two outlets, including a generally axial liquid supernatant outlet and a solids outlet adjacent said inner surface of said canister housing;
   a central generally cylindrical annular filter element having a plurality of circumferentially spaced filter pores;
   rotatably supported external centrifugal radial fins extending generally radially from adjacent an exterior surface of said filter element to adjacent said generally cylindrical internal surface of said canister housing relative to, said external centrifugal fins canted relative to an axis of rotation; and
   a drive mechanism rotating said external cylindrical radial fins and said filter element driving solids radially outwardly toward said generally cylindrical internal surface of said canister housing and said solids outlet with liquid supernatant flowing through said annular filter element to said generally axial liquid supernatant outlet.

8. The centrifugal filter apparatus as defined in claim 7, wherein said centrifugal filter apparatus includes internal centrifugal radial fins rotatably driven within said annular filter element and said drive mechanism rotatably drives said internal centrifugal radial fins.

9. The centrifugal filter apparatus as defined in claim 8, wherein said internal centrifugal radial fins are canted relative to an axis of rotation, said internal centrifugal fins driving liquid supernatant downwardly through said generally axial liquid supernatant outlet.

10. The centrifugal filter apparatus as defined in claim 7, wherein said central generally cylindrical annular filter element includes a continuous resilient helical coil having a plurality of interconnected generally circular helical coils, said generally circular helical coils having a generally regular sinusoidal shape in a direction of the helix including opposed contacting flat top and bottom surfaces forming loop-shaped circumferentially spaced filter pores between adjacent coils, and said centrifugal filter apparatus including a filter drive engaging said helical coil compressing and releasing compression of said helical coil to decrease or increase a volume of said loop-shaped filter pores.

11. The centrifugal filter apparatus as defined in claim 10, wherein said filter drive further rotates one generally circular helical coil relative to a remainder of said generally circular helical coils into and out of registry, thereby modifying a volume of said loop-shaped filter pores.

12. The centrifugal filter apparatus as defined in claim 10, wherein said filter drive includes a piston driven against said helical coil by pneumatic or hydraulic pressure.

13. A filter apparatus, comprising:
   a continuous flexible resilient generally cylindrical helical coil including a plurality of interconnected generally circular helical coils having a substantially regular sinusoidal shape in the direction of the helix, including opposed top and bottom surfaces of adjacent coils in contact at circumferentially spaced locations forming loop-shaped filter pores between adjacent coils;
   a first filter drive engaging said helical coil compressing or releasing compression of said helical coil to decrease or increase a volume of said loop-shaped filter pores; and
   a second filter drive engaging said helical coil and rotating one of said generally circular helical coils relative to a remainder of said generally circular helical coils into and out of registry, thereby modifying and controlling a volume of said loop-shaped filter pores.

14. The filter apparatus as defined in claim 13, wherein said first filter drive includes a piston driven against said helical coil by pneumatic or hydraulic pressure for quick release during purging.

15. The filter apparatus as defined in claim 13, wherein said second filter drive is a stepper motor connected to said helical coil accurately rotating and controlling rotation of one of said generally circular helical coils relative to a remainder of said generally circular helical coils.

16. A centrifugal filter apparatus, comprising:
   a canister housing having an enclosed internal filter chamber, an inlet and an outlet;
   a central annular filter element formed of a continuous flexible resilient helical coil having a regular sinusoidal shape in the direction of the helix defining circumferentially spaced filter pores between adjacent coils;
   external centrifugal radial fins extending generally radially from adjacent an external surface of said annular filter element to adjacent an internal surface of said filter chamber;
   internal centrifugal radial fins rotatably supported within said annular filter element; and
   a drive mechanism rotating said external and internal centrifugal radial fins.

* * * * *